US012539240B2

(12) United States Patent
Rowland et al.

(10) Patent No.: US 12,539,240 B2
(45) Date of Patent: Feb. 3, 2026

(54) HEADREST FOR SURGICAL PROCEDURES

(71) Applicant: Modsel Pty Ltd, Maryborough (AU)

(72) Inventors: Lester Rowland, Maryborough (AU); Aaron Mazzotta, Maryborough (AU)

( * ) Notice: Subject to any disclaimer, the term of this patent is extended or adjusted under 35 U.S.C. 154(b) by 232 days.

(21) Appl. No.: 18/281,170

(22) PCT Filed: Mar. 24, 2022

(86) PCT No.: PCT/AU2022/050269
§ 371 (c)(1),
(2) Date: Sep. 8, 2023

(87) PCT Pub. No.: WO2022/198276
PCT Pub. Date: Sep. 29, 2022

(65) Prior Publication Data

US 2024/0148572 A1 May 9, 2024

(30) Foreign Application Priority Data

Mar. 26, 2021 (AU) ................................ 2021900902

(51) Int. Cl.

| | |
|---|---|
| ***A47C 7/36*** | (2006.01) |
| ***A47C 7/38*** | (2006.01) |
| ***A61G 1/04*** | (2006.01) |
| ***A61G 5/12*** | (2006.01) |
| ***A61G 13/12*** | (2006.01) |
| ***A61G 15/12*** | (2006.01) |

(52) U.S. Cl.
CPC ............... *A61G 1/04* (2013.01); *A61G 5/121* (2016.11); *A61G 13/121* (2013.01); *A61G 15/12* (2013.01); *A61G 15/125* (2013.01); *A47C 7/36* (2013.01)

(58) Field of Classification Search
CPC ...... A61G 5/121; A61G 13/121; A61G 15/12; A61G 15/125; A47C 7/36
See application file for complete search history.

(56) References Cited

U.S. PATENT DOCUMENTS 3,817,576 A * 6/1974 Ciavattoni ........... A61G 15/125 297/408 X
3,936,091 A * 2/1976 Rabinowitz .......... A61G 15/125 297/408 X
4,014,594 A * 3/1977 Hain ........................ A47C 7/38 297/408 X
4,017,118 A * 4/1977 Cawley ................ A61G 15/125 297/410 X (Continued)

FOREIGN PATENT DOCUMENTS

CN 107811800 A 3/2018

*Primary Examiner* — Rodney B White
(74) *Attorney, Agent, or Firm* — Bryan W. Bockhop; Bockhop Intellectual Property Law, LLC

(57) ABSTRACT

A headrest for a mobile patient transport apparatus is arranged to support a patient during minor surgical procedures. The headrest includes a neck supporting portion which is hinged to a backrest of the apparatus, and a head supporting portion which is hinged to the neck supporting portion. Each of the neck supporting portion and head supporting portion is connected to a respective actuator. The actuators can be independently operated to cause pivoting of the neck supporting portion relative to the backrest and/or pivoting of the head supporting portion relative to the neck supporting portion.

15 Claims, 6 Drawing Sheets

(56) References Cited

U.S. PATENT DOCUMENTS 4,312,538 A * 1/1982 Kennedy .............. A61G 15/125 297/408 X
4,353,595 A * 10/1982 Kaneko .................... A47C 7/38 297/408 X
4,366,985 A * 1/1983 Leffler ................. A61G 15/125 297/409 X
4,375,902 A * 3/1983 Tai ........................... A47C 7/38 297/408 X
4,840,429 A * 6/1989 Stockl .................. A61G 15/125 297/409 X
5,346,283 A * 9/1994 Steininger ............ A61G 15/125 297/408 X
5,628,546 A * 5/1997 Boetzkes ............. A61G 15/125 297/330 X
5,730,497 A * 3/1998 Raymond ............ A61G 15/125 297/408 X
5,791,735 A * 8/1998 Helman ................... A61G 5/12 297/407
6,013,882 A * 1/2000 Boetzkes ................. H01H 3/14 200/86.5
6,510,852 B1 1/2003 Shiery et al.
6,520,585 B1 * 2/2003 Georg .................. A61G 15/125 297/408 X
6,592,185 B2 * 7/2003 Lew ....................... A61G 15/00 297/408 X
6,739,006 B2 * 5/2004 Borders ................. A61G 13/08 5/622
6,893,096 B2 * 5/2005 Bonn ................... A61G 15/125 297/408 X
7,032,975 B2 * 4/2006 Hummler ............. A61G 15/125 297/409 X
7,240,966 B2 * 7/2007 Stone ................... A61G 15/125 297/408 X
7,451,507 B2 * 11/2008 Brinkerhoff ........... A61G 13/12 5/637
7,802,851 B2 * 9/2010 Hyvarinen ........... A61G 15/125 297/408 X
7,871,130 B2 * 1/2011 da Silva Netto .... A61G 15/125 297/408 X
8,037,884 B2 * 10/2011 Weinstein .............. A61G 13/12 128/845
8,413,660 B2 * 4/2013 Weinstein .......... A61G 13/0054 128/845
8,876,210 B2 * 11/2014 Magstadt ............. A61G 15/125 297/408 X
10,188,868 B2 * 1/2019 Hynninen .............. A61N 2/006
10,881,570 B2 * 1/2021 Lim ........................ A61G 13/04
10,888,484 B2 * 1/2021 Lim .................... A61G 13/0036
10,898,000 B2 * 1/2021 Romano ................ A61G 15/02
10,898,401 B2 * 1/2021 Lim ........................ A61G 13/08
10,900,448 B2 * 1/2021 Lim ...................... F02M 31/186
11,166,681 B2 * 11/2021 Bardo .................... A61B 6/501
11,304,867 B2 * 4/2022 Lim ...................... A61G 7/1019
11,369,538 B2 * 6/2022 Lim ...................... A61G 13/121
11,426,128 B1 * 8/2022 Ruby ................... A61G 13/125
11,510,494 B2 * 11/2022 DuFresne .............. B60N 2/806
11,540,968 B2 * 1/2023 Christensen ......... A61G 15/125
11,624,342 B2 * 4/2023 Lim ...................... F02M 31/183 123/549
11,813,217 B2 * 11/2023 Lim ...................... A61G 7/1055
11,850,191 B2 * 12/2023 Lim .................... A61G 13/1235
12,123,381 B2 * 10/2024 Lim ........................ A61G 13/08
12,167,985 B2 * 12/2024 Hyvärinen ........... A61G 15/125
12,208,046 B2 * 1/2025 Lim ........................ A61G 7/103
2007/0272808 A1 * 11/2007 Schuerch ............. A61G 15/125 248/118
2016/0058660 A1 3/2016 Lurie et al.
2017/0087037 A1 * 3/2017 Scarlett ................ A61G 5/1056
2017/0252242 A1 * 9/2017 Young .................... A61G 15/12
2020/0100973 A1 4/2020 Sullivan et al.

* cited by examiner

HEADREST FOR SURGICAL PROCEDURES

FIELD OF THE INVENTION

The present invention relates to a headrest for attachment to a stretcher, chair, or other mobile patient transport apparatus for use in a surgical environment.

BACKGROUND TO THE INVENTION

A variety of surgical procedures are done on a patient's head, including eye surgery, ear-nose-and-throat surgery, facial surgery and reconstructive surgery. In many cases such procedures are relatively quick. Typically, a patient is positioned on a mobile support such as a stretcher or mobile chair, and the mobile support is moved from a pre-op environment, to surgery, to a post-op environment with the patient remaining supported.

It is important that the patient's head is securely supported during surgery at an optimum angle for the surgeon performing the procedure. This angle will vary depending on the nature on the surgery, the particular patient, and the preferences of the particular surgeon. It is therefore desirable to provide a support for a patient's head which is adjustable.

The applicant is aware of some adjustable headrests being employed in mobile supports. These generally fall into two categories: threaded adjustment where knobs are provided to wind the headrest into a desired position, and cable adjustment using frictional locks. Some mechanisms can provide a platform which is not sufficiently stable for delicate procedures. Moreover, they are subject to wear which can lead to slippage and potential injury to the patient.

Adjustment of such headrests is a manual procedure, requiring physical interaction between a surgeon or assistant and the adjustment mechanism. This can present problems both for access to controls and the possibility of contamination of sterile environments.

A further disadvantage of known adjustable headrests is that pivot points of the headrest, such as the connection to a backrest, often requires a gap. This means that liquids such as antiseptic solutions are prone to drain into the gap and into the mechanism of the adjustable headrest.

The present invention has been devised in light of these issues.

SUMMARY OF THE INVENTION

According to one aspect of the present invention there is provided a headrest for a mobile patient transport apparatus, the mobile patient transport apparatus having a backrest, the headrest including a neck supporting portion which is hinged to the backrest and a head supporting portion which is hinged to the neck supporting portion, the neck supporting portion having a frame connected to a first actuator and the head supporting portion having a frame connected to a second actuator, whereby the first and second actuators can be independently operated to cause pivoting of the neck supporting portion relative to the backrest and/or pivoting of the head supporting portion relative to the neck supporting portion.

It is preferred that each actuator includes a connecting rod arranged for axial movement. The connecting rod may be arranged to engage with a motor via a linear actuator. In a preferred embodiment, the linear actuator is a worm drive. Advantageously, this provides a high degree of rigidity when the worm drive is stopped. The motor is preferably an electric motor.

Advantageously, the motors and linear actuators have a continuous range of movement allowing for positioning of the head supporting portion and neck supporting portion in any desired position, and allowing for incremental adjustments.

It will be appreciated that the headrest may have two electric motors each of which can be operated independently, each motor being associated with a respective actuator. It is preferred that the motors are positioned beneath the backrest of the mobile patient transport apparatus.

It is preferred that the headrest is contiguous. Preferably, the headrest is formed from a single piece, with the neck supporting portion and head supporting portion being connected at a flexure formed by narrowing of the material from which the headrest is made. Advantageously, this eliminates gaps in the surface.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
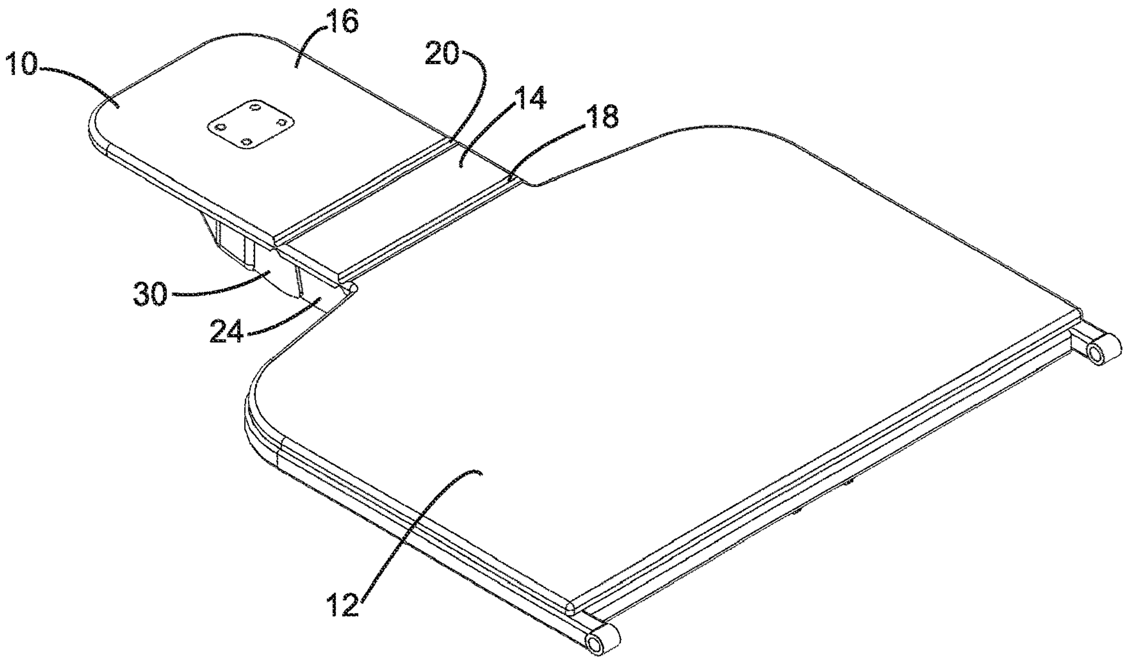
FIG. 1 is an upper perspective of a headrest in accordance with the present invention.
Figure 2:
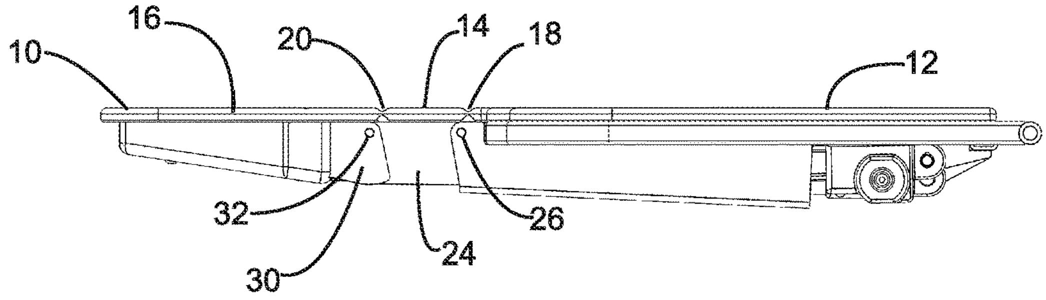
FIG. 2 is a side view of the headrest of FIG. 1 shown in a flat configuration.
Figure 3:
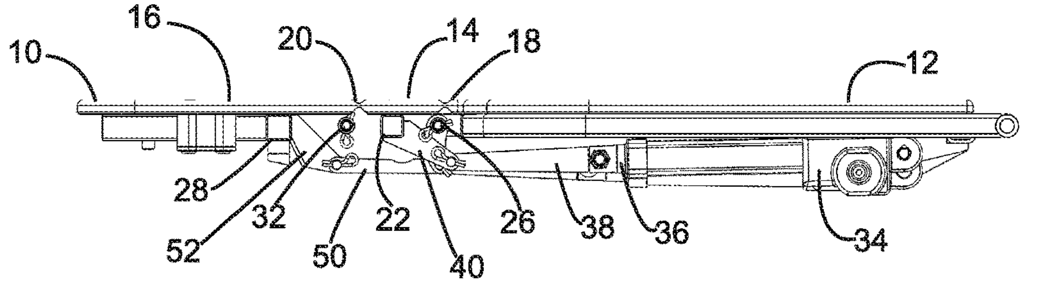
FIG. 3 is a cut-away side view of the headrest of FIG. 1 shown in the flat configuration of FIG. 2.
Figure 4:
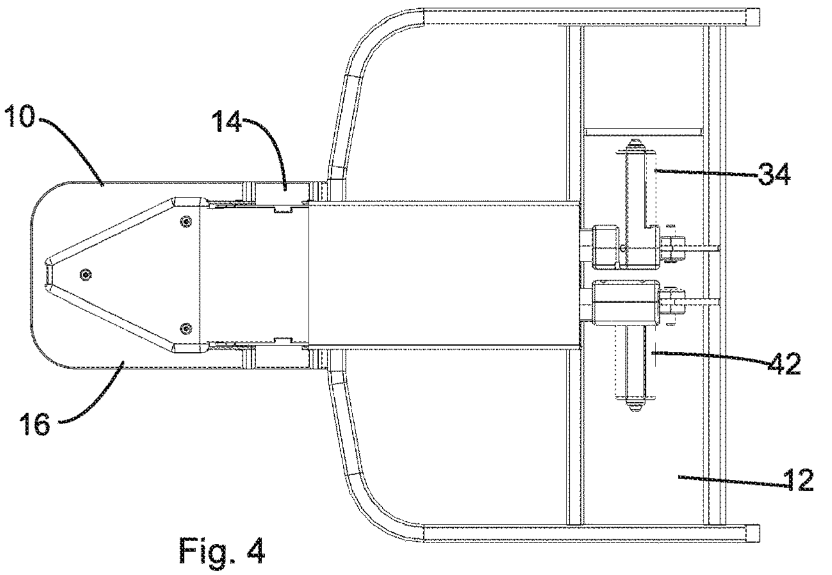
FIG. 4 is an under view of the headrest of FIG. 1 shown in the flat configuration of FIG. 2.
Figure 5:
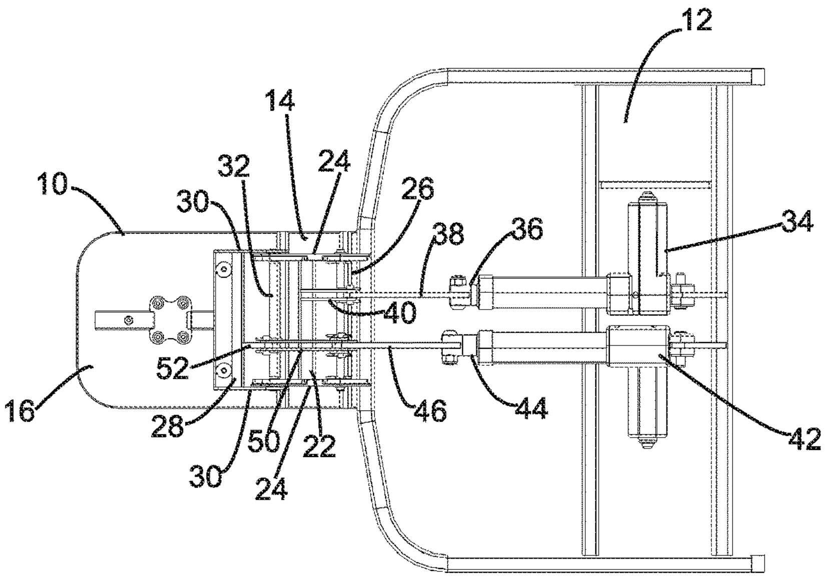
FIG. 5 is a cut-away under view of the headrest of FIG. 1 shown in the flat configuration of FIG. 2.
Figure 6:
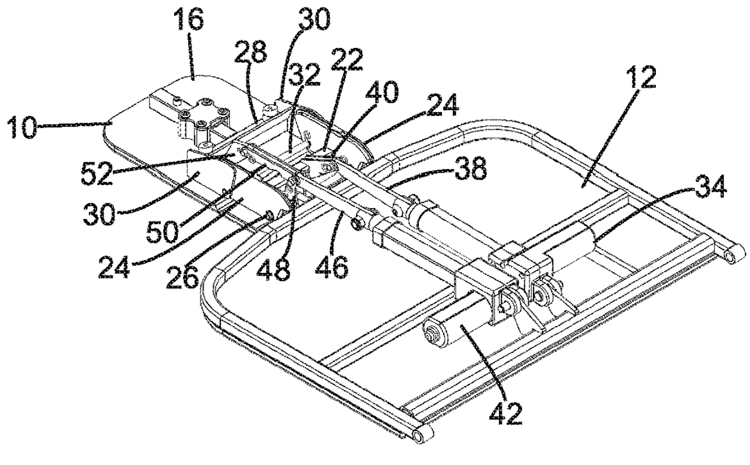
FIG. 6 is a cut-away under perspective of the headrest of FIG. 1 shown in the flat configuration of FIG. 2.

Referring to the Figures, FIG. 1 shows a headrest 10 which is connected to the backrest 12 of a mobile patient transport apparatus (not shown). The headrest 10 is divided into two portions: a neck supporting portion 14 and a head supporting portion 16.

The headrest 10 and backrest 12 are moulded in a single contiguous piece of plastic. The neck supporting portion 14 is connected to the backrest 12 along an inner flexure 18 which is formed by a thinning of the plastic in a line oriented in a transverse direction. The head supporting portion 16 is connected to the neck supporting portion 14 along an outer flexure 20 which is formed by a thinning of the plastic in a line parallel to the inner flexure 18. In the embodiment of the drawings the neck supporting portion 14, the head supporting portion 16, the inner flexure 18 and the outer flexure 20 all have the same width. The head supporting portion 16 has a length about four times that of the neck supporting portion 14. It will be appreciated that other shapes of the neck supporting portion 14 and head supporting portion 16 are possible.

Each of the neck supporting portion 14 and the head supporting portion 16 has a supporting frame located on an underside thereof. The frame underneath the neck supporting portion 14 has a cross member 22 oriented in the transverse direction, which is fixed to two side members 24. The two side members 24 are arranged to rotate about a transverse hinge 26 which is located generally beneath the inner flexure 18.

Similarly, the frame underneath the head supporting portion 16 has a cross member 28 oriented in the transverse direction, which is fixed to two side members 30. The two side members 30 are arranged to rotate relative to the side members 24 of the neck supporting portion 14. This rotation is about a transverse hinge 32 which is located generally beneath the outer flexure 20. The transverse hinge 32 passes through aligned apertures of the side members 24, 30 of both the neck supporting portion 14 and head supporting portion 16.

A first electric motor 34 is located beneath the backrest 12. The first electric motor 34 has a laterally extending piston 36 at an outer end thereof. The laterally extending piston 36 is connected to the first electric motor 34 by a worm drive arrangement (not shown). The arrangement is such that a controller (not shown) can be used to actuate the first electric motor 34 and to move the laterally extending piston 36 in an axial direction as desired. When the first electric motor 34 is not actuated then the laterally extending piston 36 is held in a fixed axial position.

The laterally extending piston 36 has a first connecting rod 38 fixed thereto, extending away from the laterally extending piston 36 in the axial direction. A second connecting rod 40 extends from the first connecting rod 38 to the cross member 22 of the neck supporting portion 14. The first connecting rod 38 is pinned to both the piston 36 and the second connecting rod 40, and is able to pivot relative to both the piston 36 and the second connecting rod 40. The second connecting rod 40 is rigidly fixed to the cross member 22 of the neck supporting portion 14.

The arrangement is such that axial movement of the laterally extending piston 36 causes axial movement of the first connecting rod 38. The rigid connection of the second connecting rod 40 to the supporting frame of the neck portion means that this axial movement results in rotation of the neck supporting portion 14 about the transverse hinge 26 and corresponding bending of the inner flexure 18.

A second electric motor 42 is located beneath the backrest 12, alongside and parallel to the first electric motor 34. It has a laterally extending piston 44 which operates in a similar fashion to the laterally extending piston 36 of the first electric motor 34. A third connecting rod 46 extends away from the laterally extending piston 44 of the second electric motor 42, with an outer end being pinned to a support arm 48. The support arm 48 is pinned in turn to the transverse hinge 26.

A fourth connecting rod 50 extends from the support arm 48 in a direction generally away from the third connecting rod 46. A fifth connecting rod 52 extends from the fourth connecting rod 50 to the cross member 28 of the head supporting portion 16.

The third connecting rod 46 is pinned to both the piston 44 and the fourth connecting rod 50, and is able to pivot relative to both the piston 44 and the fourth connecting rod 50. The fifth connecting rod 52 is pinned to the fourth connecting rod 50, and is able to pivot relative to the fourth connecting rod 50. The fifth connecting rod 52 is rigidly fixed to the cross member 28 of the head supporting portion 16.

The arrangement is such that axial movement of the laterally extending piston 44 causes axial movement of the third connecting rod 46. This causes rotation of the support arm 48 about the transverse hinge 26. This, in turn causes axial movement of the fourth connecting rod 50. The rigid connection of the fifth connecting rod 52 to the supporting frame of the head supporting portion 16 means that this axial movement results in rotation of the head supporting portion 16 about the transverse hinge 32 and corresponding bending of the outer flexure 20.

Use of the first and second electric motors 34, 42 will be described with reference to the Figures.

FIGS. 1 to 6 show a position where the neck supporting portion 14 and the head supporting portion 16 are generally aligned with the backrest 12.

Figure 7:
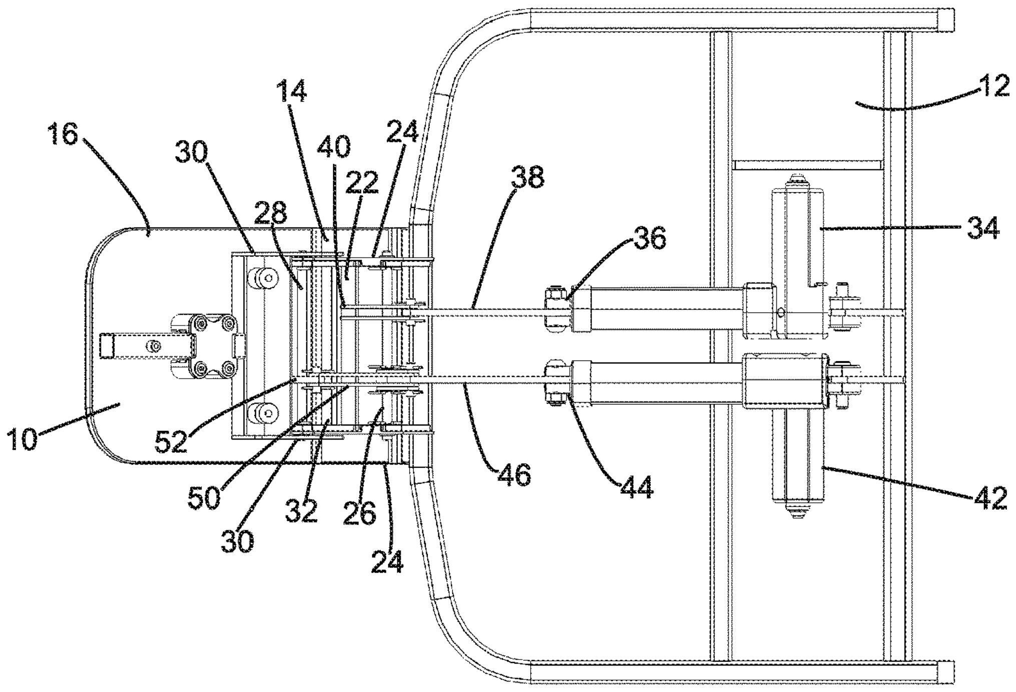
FIG. 7 is a cut-away under view of the headrest of FIG. 1 shown in a lowered configuration.
Figure 8:
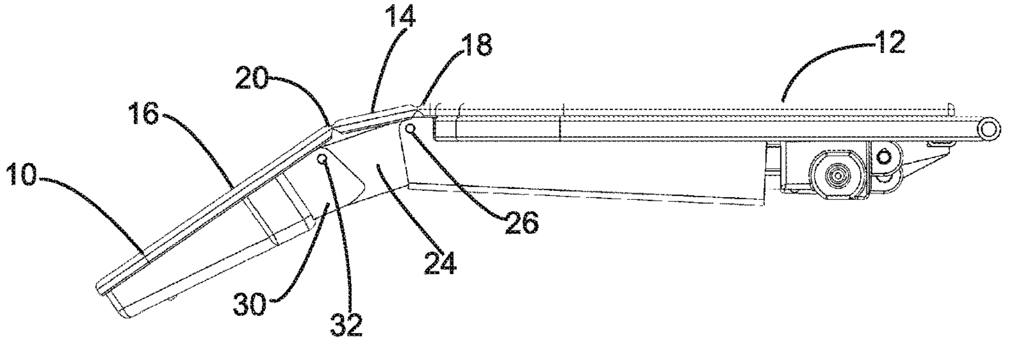
FIG. 8 is a side view of the headrest of FIG. 1 shown in the lowered configuration of FIG. 7.
Figure 9:
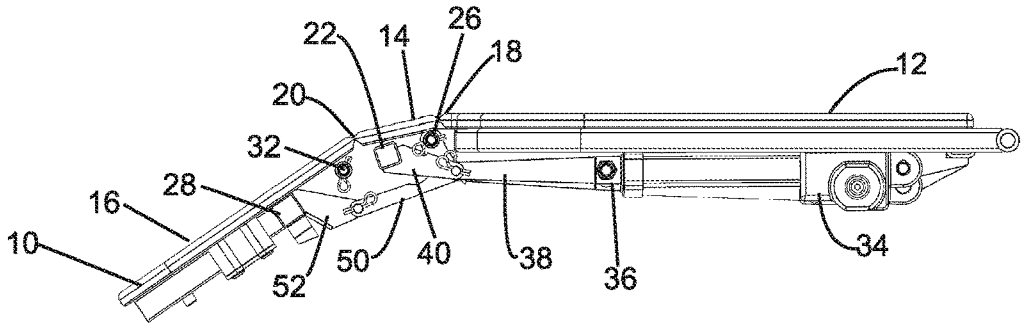
FIG. 9 is a cut-away side view of the headrest of FIG. 1 shown in the lowered configuration of FIG. 7.

If the first electric motor 34 is operated to reduce the length of the laterally extending piston 36, then the neck supporting portion 14 will pivot about the transverse hinge 26, causing the inner flexure 18 to bend in a downward direction relative to the backrest 12. Similarly, if the second electric motor 42 is operated to reduce the length of the laterally extending piston 44 then the head supporting portion 16 will pivot about the transverse hinge 32, causing the outer flexure 20 to bend in a downward direction relative to the neck supporting portion 14. This is shown in FIGS. 7 to 9.

Figure 10:
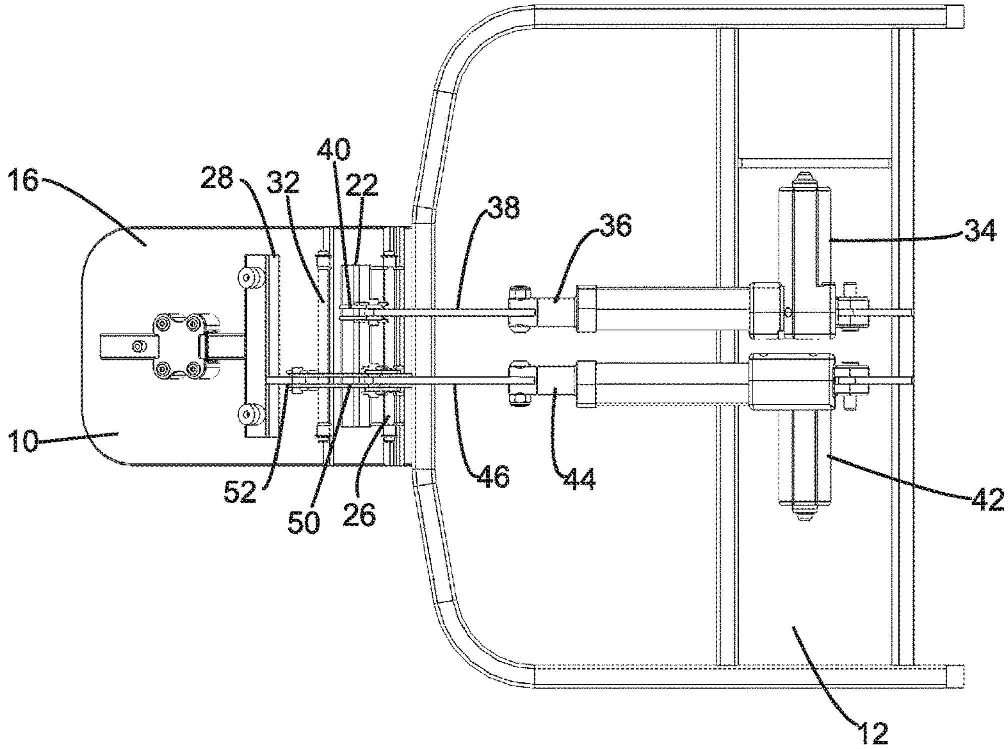
FIG. 10 is a cut-away under view of the headrest of FIG. 1 shown in a raised configuration.
Figure 11:
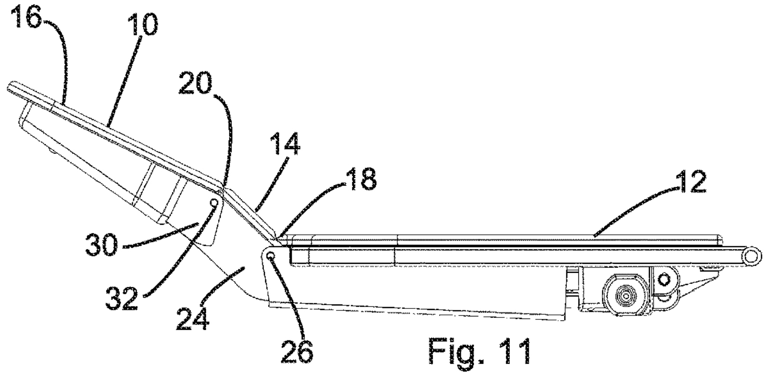
FIG. 11 is a side view of the headrest of FIG. 1 shown in the raised configuration of FIG. 10.
Figure 12:
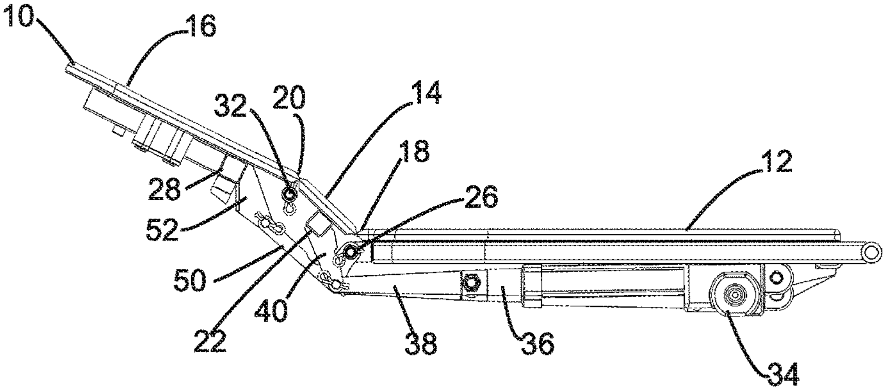
FIG. 12 is a cut-away side view of the headrest of FIG. 1 shown in the raised configuration of FIG. 10.

If the first electric motor 34 is operated to increase the length of the laterally extending piston 36, then the neck supporting portion 14 will pivot about the transverse hinge 26, causing the inner flexure 18 to bend in an upward direction relative to the backrest 12. Similarly, if the second electric motor 42 is operated to increase the length of the laterally extending piston 44 then the head supporting portion 16 will pivot about the transverse hinge 32, causing the outer flexure 20 to bend in an upward direction relative to the neck supporting portion 14. This is shown in FIGS. 10 to 12.

Figure 13:
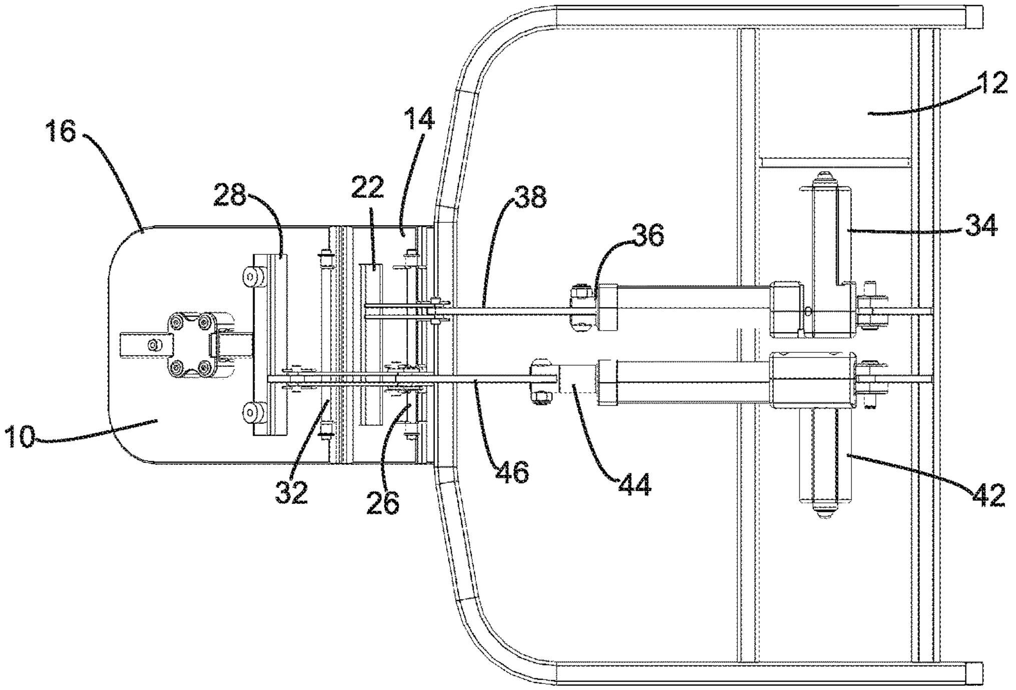
FIG. 13 is a cut-away under view of the headrest of FIG. 1 shown in a "neck down head up" configuration.
Figure 14:
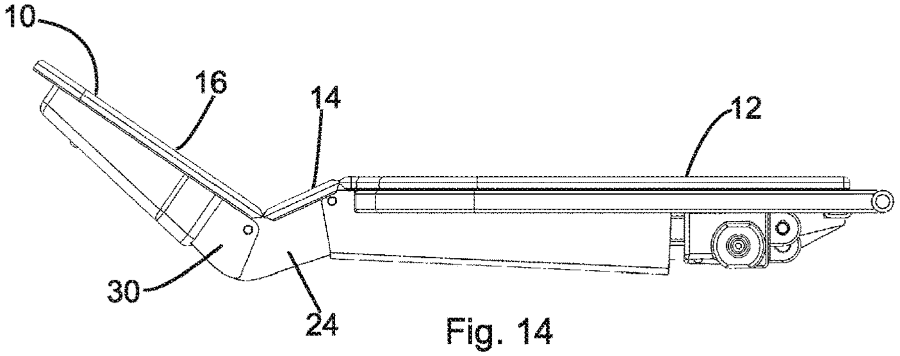
FIG. 14 is a side view of the headrest of FIG. 1 shown in the "neck down head up" configuration of FIG. 13.
Figure 15:
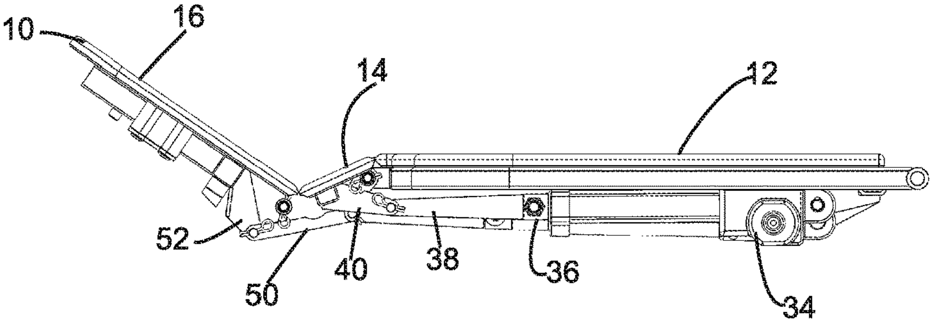
FIG. 15 is a cut-away side view of the headrest of FIG. 1 shown in the "neck down head up" configuration of FIG. 13.
Figure 16:
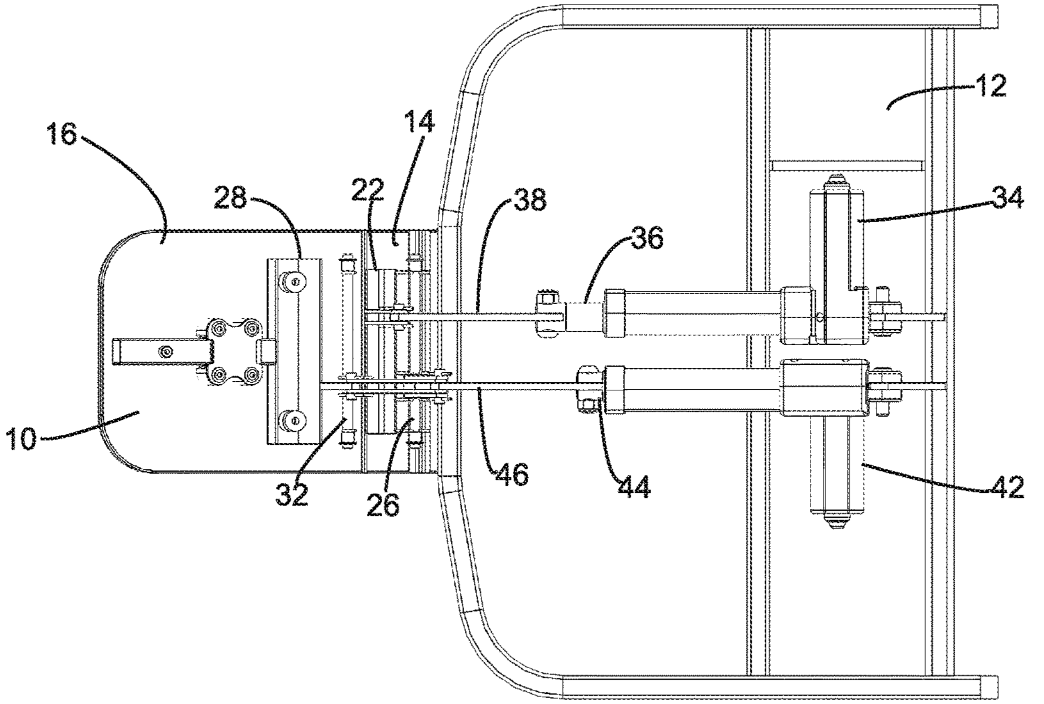
FIG. 16 is a cut-away under view of the headrest of FIG. 1 shown in a "neck up head down" configuration.
Figure 17:
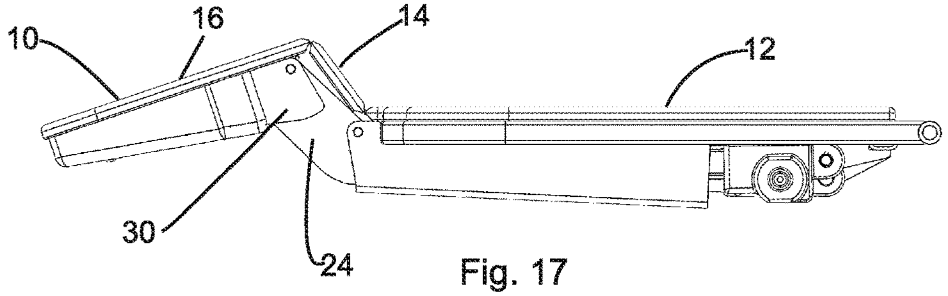
FIG. 17 is a side view of the headrest of FIG. 1 shown in the "neck up head down" configuration of FIG. 16.
Figure 18:
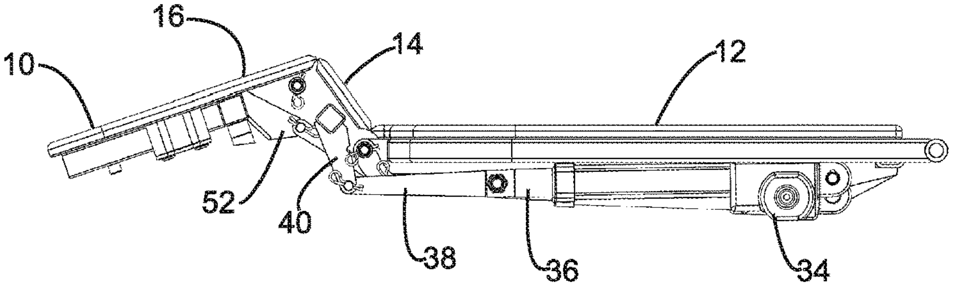
FIG. 18 is a cut-away side view of the headrest of FIG. 1 shown in the "neck up head down" configuration of FIG. 16.

If the first electric motor is operated to decrease the length of the laterally extending piston 36, and the second electric motor 42 is operated to increase the length of the laterally extending piston 44, then the headrest 10 will assume a position wherein the neck supporting portion 14 is angled downwardly relative to the backrest 12 and the head supporting portion 16 is angled upwardly relative to the neck supporting portion 14. This is shown in FIGS. 13 to 15.

Conversely, if the first electric motor 34 is operated to increase the length of the laterally extending piston 36, and the second electric motor 42 is operated to decrease the length of the laterally extending piston 44, then the headrest 10 will assume a position wherein the neck supporting portion 14 is angled upwardly relative to the backrest 12 and the head supporting portion 16 is angled downwardly relative to the neck supporting portion 14. This is shown in FIGS. 16 to 19.

It will be appreciated that the Figures show examples of the positions which can be achieved by the headrest 10, but that these examples are not limiting. The headrest 10 can achieve any position within its limits of movement.

Modifications and variations as would be apparent to a skilled addressee are deemed to be within the scope of the present invention.

The invention claimed is:

1. A headrest for a mobile patient transport apparatus, the mobile patient transport apparatus having a backrest, the headrest including a neck supporting portion which is hinged to the backrest and a head supporting portion which is hinged to the neck supporting portion, the neck supporting portion having a frame connected to a first actuator and the head supporting portion having a frame connected to a second actuator, whereby the first and second actuators can be independently operated to cause pivoting of the neck supporting portion relative to the backrest and/or pivoting of the head supporting portion relative to the neck supporting portion, wherein each actuator includes a connecting rod arranged for axial movement.

2. A headrest for a mobile patient transport apparatus as claimed in claim 1, wherein the connecting rod may be arranged to engage with a motor via a linear actuator.

3. A headrest for a mobile patient transport apparatus as claimed in claim 2, wherein the linear actuator is a worm drive.

4. A headrest for a mobile patient transport apparatus as claimed in claim 2, wherein the motor is an electric motor.

5. A headrest for a mobile patient transport apparatus as claimed in claim 2, wherein the headrest has two electric motors, each of which can be operated independently, each motor being associated with a respective actuator.

6. A headrest for a mobile patient transport apparatus as claimed in claim 2, wherein the motors are positioned beneath the backrest of the mobile patient transport apparatus.

7. A mobile patient transport apparatus having a headrest as claimed in claim 1.

8. A headrest for a mobile patient transport apparatus as claimed in claim 1, wherein the headrest is contiguous.

9. A headrest for a mobile patient transport apparatus for a mobile patient transport apparatus, the mobile patient transport apparatus having a backrest, the headrest including a neck supporting portion which is hinged to the backrest and a head supporting portion which is hinged to the neck supporting portion, the neck supporting portion having a frame connected to a first actuator and the head supporting portion having a frame connected to a second actuator, whereby the first and second actuators can be independently operated to cause pivoting of the neck supporting portion relative to the backrest and/or pivoting of the head supporting portion relative to the neck supporting portion, wherein the headrest is contiguous and is formed from a single piece, with the neck supporting portion and head supporting portion being connected at a flexure formed by narrowing of the material from which the headrest is made.

10. A headrest for a mobile patient transport apparatus as claimed in claim 9, wherein the connecting rod may be arranged to engage with a motor via a linear actuator.

11. A headrest for a mobile patient transport apparatus as claimed in claim 10, wherein the linear actuator is a worm drive.

12. A headrest for a mobile patient transport apparatus as claimed in claim 10, wherein the motor is an electric motor.

13. A headrest for a mobile patient transport apparatus as claimed in claim 10, wherein the headrest has two electric motors, each of which can be operated independently, each motor being associated with a respective actuator.

14. A headrest for a mobile patient transport apparatus as claimed in claim 10, wherein the motors are positioned beneath the backrest of the mobile patient transport apparatus.

15. A mobile patient transport apparatus having a headrest as claimed in claim 9.

* * * * *